United States Patent [19]

Workman et al.

[11] 4,377,106

[45] Mar. 22, 1983

[54] TAMPER-RESISTANT LOCKING CLIP FOR DISPENSING PUMPS

[75] Inventors: James P. Workman, Spring Hill, Kans.; Larry L. Hudson, Lee's Summit, Mo.

[73] Assignee: Realex Corporation, Kansas City, Mo.

[21] Appl. No.: 164,306

[22] Filed: Jun. 30, 1980

[51] Int. Cl.$^3$ ...................... F15B 15/26; F16K 35/00; B67D 5/32

[52] U.S. Cl. ...................................... 92/23; 222/153; 251/90

[58] Field of Search ...................... 92/23; 60/635, 636; 215/256, 254; 220/265, 266; 222/402.11, 384, 153; 251/90

[56] References Cited

U.S. PATENT DOCUMENTS

| | | | |
|---|---|---|---|
| 3,097,758 | 7/1963 | Gershen et al. | 220/265 |
| 3,173,585 | 3/1965 | Kahn | 222/402.11 |
| 3,250,436 | 5/1966 | Kurtz | 222/153 |
| 3,325,054 | 6/1967 | Braun | 222/402.11 |
| 3,422,996 | 1/1969 | Lipman | 222/402.11 |
| 3,590,691 | 7/1971 | Magers | 92/23 |
| 3,650,428 | 3/1972 | Miller | 215/256 |
| 3,653,529 | 4/1972 | Segmuller | 215/256 |
| 3,860,148 | 1/1975 | Sherin | 220/266 |
| 3,884,393 | 5/1975 | Wassilieff | 222/402.11 |
| 3,888,383 | 6/1975 | Rowlands | 220/265 |
| 4,071,173 | 1/1978 | Horan | 222/402.11 |
| 4,318,498 | 3/1982 | Magers et al. | 222/153 |

*Primary Examiner*—Martin P. Schwadron
*Assistant Examiner*—Richard L. Klein
*Attorney, Agent, or Firm*—Schmidt, Johnson, Hovey & Williams

[57] ABSTRACT

A disposable, one-piece locking clip may be snapped onto a dispensing pump directly below the depressible head thereof for the purpose of blocking depression of the head so long as the clip is in place. The clip may be attached to and serve as an overlock for a permanent, selectively operable lock intended to remain with the pump indefinitely as a way of preventing accidental fluid discharge during periods of nonuse, the clip in that event serving as a means for preventing access to the permanent lock. The specific manner in which the clip is snap-fitted in place is unexposed and virtually nonaccessible so as to prevent removal of the clip or actuation of the pump without first pulling a break tab that splits the clip in half and releases the same from the pump.

18 Claims, 6 Drawing Figures

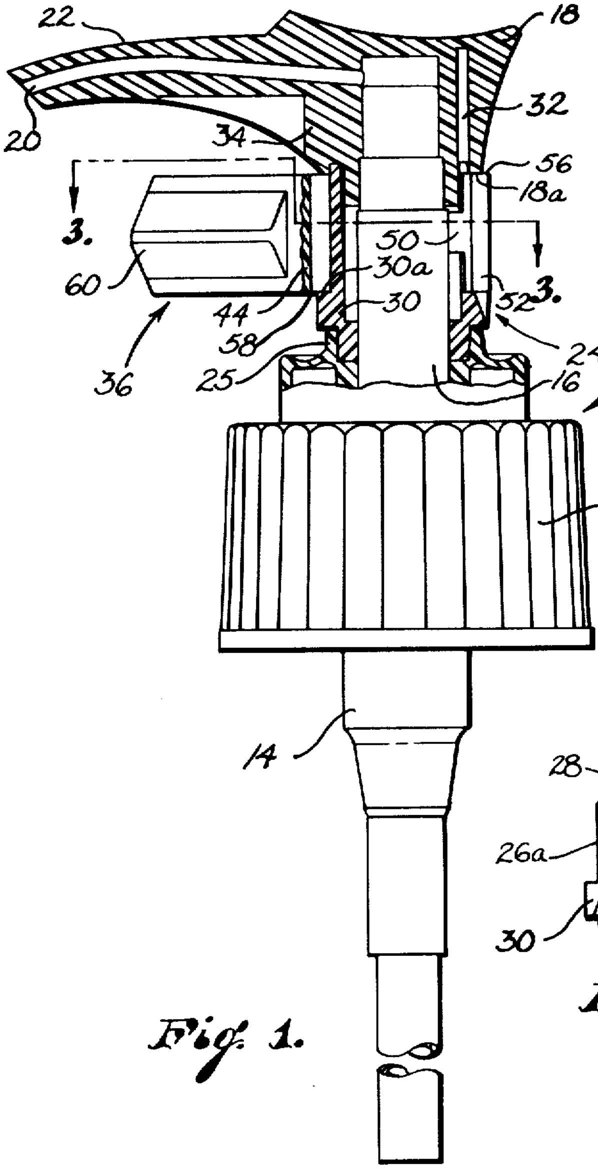
Fig. 1.
Fig. 2.
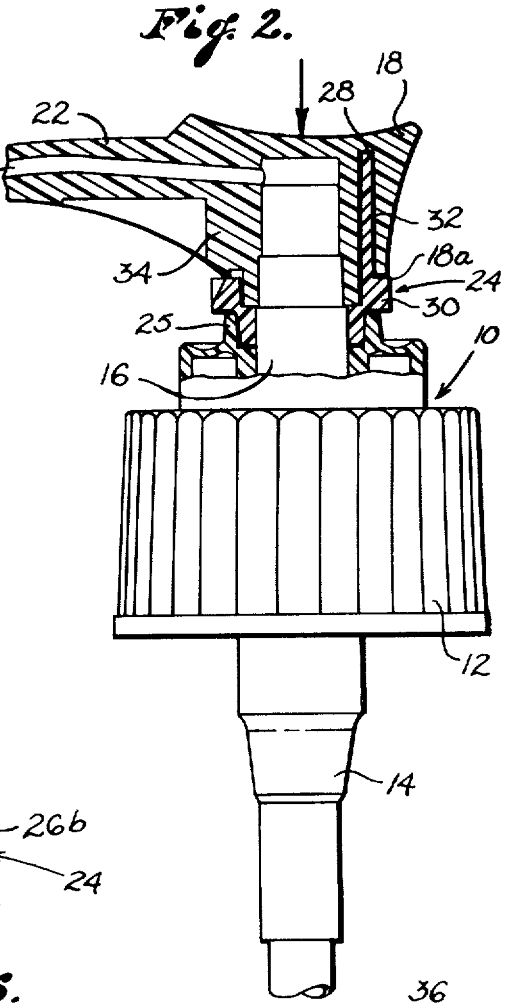
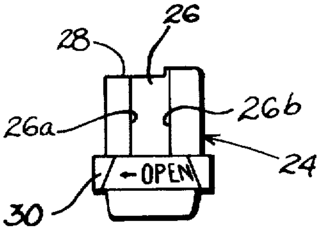
Fig. 6.
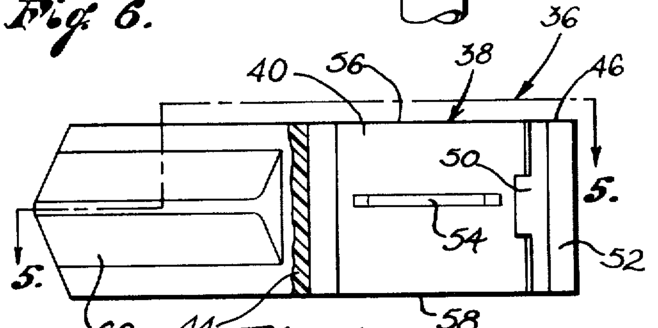
Fig. 4.
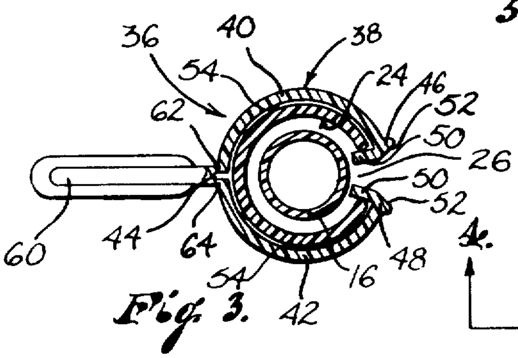
Fig. 3.
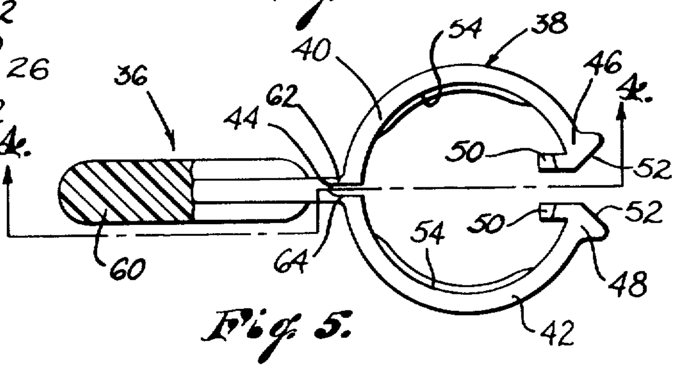
Fig. 5.

TAMPER-RESISTANT LOCKING CLIP FOR DISPENSING PUMPS

TECHNICAL FIELD

This invention relates to hand pumps and, more particularly, to the way in which the depressible heads of such pumps may be locked in an "up" position to prevent actuation.

BACKGROUND ART

One example of a lock of the uplocking type may be found in U.S. Pat. No. 3,590,691, issued in the name of Wallace F. Magers, and assigned to the assignee of the present invention. Therein, a locking collar or band is illustrated which is located directly below the actuating head of the pump and which can be rotated about the plunger to and from a position in which the collar blocks depression of the head to dispense a portion of the substance controlled by the pump. That particular device is intended to remain on the pump at all times throughout its useful life and serves primarily as a convenient means by which the user can guard against accidental discharge of any product during periods of nonuse of the pump.

While the device of said patent performs admirably for its intended purpose, there are times when it would be desirable to disable even that particular device and preclude access to it as well, at least on a temporary basis. For example, when the item is sitting on a retailer's shelf prior to purchase, it is desirable to prevent the unauthorized or accidental unlocking of the pump and subsequent discharge of its contents. However, a lock such as that referred to in U.S. Pat. No. 3,590,691 is by its very nature readily accessible and easily operated so as to facilitate such "prepurchase" dispensing of the product.

Moreover, it is difficult to assure that a lock of the releasable type will always be properly positioned during shipment such as to prevent accidental product discharge during jostling and other handling of the items.

SUMMARY OF THE PRESENT INVENTION

Accordingly, one important object of the present invention is to provide a device having particular, although not exclusive, utility in connection with a releasable lock of the type in the aforesaid patent to serve as a tamper-resistant, temporary overlock that would normally be removed and discarded at the time of first use of the pump.

Another important object of the invention is to provide a locking clip for hand pumps whose inventive principles do not limit the device to use as an overlock as aforesaid, but rather apply equally to the situation where the lock is to be the only, although temporary, lock for the pump. In such situations, it is contemplated that the lock may either be slipped onto the pump prior to assembly of the discharge head, or clipped onto the pump after complete assembly thereof, all dependent upon the construction of the pump and, more particularly, the nature of any structure that might cooperate with the lock to retain the latter in place and make its manner of attachment unexposed and unaccessible. In the embodiment illustrated on the drawings by way of example, the locking clip requires cooperating structure on the existing, permanent and releasable lock to retain the overlocking clip in place in the intended manner, but it is to be emphasized again that such arrangement is but one example only of the manner in which the lock of the present invention may be constructed and used.

A further important object of the present invention, where the same is to be used in the nature of an overlock as made reference to in the foregoing objects, is to provide the same of such design that it can be quite readily and easily snapped onto existing pumps in the retailer's inventory or otherwise, thereby obviating the need to redesign existing pumps or their permanent locks in order to accept the device of the present invention.

Another important object of this invention is the provision of a lock that, once installed, is so extremely difficult to remove without completely destroying the lock by pulling a break tab that human psychology may be relied upon to prevent the would-be, unauthorized user from going to that extreme simply to sample the product.

On the other hand, it is yet another important object of this invention to provide a break tab so integrated into the overall design of the lock that it can be readily manipulated to release and remove the lock from the pump when such is desired following purchase.

Other important objects include making the clip easily attachable by virtue of its symmetrical design, its embracing arms that tend to automatically spread to receive the pump when force is applied to the tips of the arms, and its snap-fit manner of securance to the pump.

BRIEF DESCRIPTION OF THE DRAWING

FIG. 1 is a partly elevational and partly vertical cross-sectional view of a hand pump and an attached locking clip in accordance with the principles of the present invention, the clip being illustrated in this instance in the nature of an overlock for an existing permanent, releasable lock on the pump, and said pump with its lock being in the nature of that described and claimed in the aforementioned patent;

FIG. 2 is a partly elevational and cross-sectional view of the pump with the overlocking clip removed and illustrating the manner in which the head may be depressed for pumping;

FIG. 3 is a fragmentary, cross-sectional view of the pump and clip assembly taken along line 3—3 of FIG. 1;

FIGS. 4 and 5 are enlarged, partially cross-sectional views of the clip rotated 90° from one another and taken respectively along lines 4—4 and 5—5 of those figures; and FIG. 6 is a front elevational view of the permanent, releasable locking collar associated with the pump.

DETAILED DESCRIPTION

The pump 10 has a knurled, skirt-like fitting 12 that adapts the pump 10 for threaded attachment onto the neck of a suitable container (not shown) in such a position that the dip tube 14 will be inserted down into the contents of the container. A plunger 16 is coaxially received within the upper portion of the fitting 12 for longitudinal reciprocation toward and away from the dip tube 14 upon depression of the discharge head 18 affixed to the upper end of the plunger 16. The latter is, of course, tubular, and cooperates with valve and spring structure (not shown) within the upper portion of tube 14 such that upon depression of the plunger 16, a portion of the contents is pumped upwardly through the interior of the plunger 16 and out of the head 18 through the aperture 20 in its nozzle 22, the plunger 16 during its upward return stroke drawing in the next charge for pumping during the subsequent downstroke.

The pump 10 may be selectively locked with its head 18 in the raised position of FIG. 1 by virtue of a permanent, releasable locking cylinder 24 surrounding the plunger 16 between the head 18 and an uppermost, annular surface 25 on the fitting 12. The cylinder 24 has a peripheral slot 26 extending vertically in one sidewall thereof from the top edge 28 downwardly to an integral ring 30. The head 18 has a discontinuous circumferential slit 32 therein disposed in vertical alignment with the cylinder 24, and the upright web 34 in head 18 that makes the slit 32 discontinuous is of such a size as to be received within the slot 26 of the cylinder 24 when the latter is rotated to align such two structures, thereby permitting the head 18 to be depressed as illustrated in FIG. 2. During such depression, the sidewall of the cylinder 24 is received within the slit 32, while the web 34 is received within the slot 26.

On the other hand, when the cylinder 24 is rotated such as to move the slot 26 out from under the web 34, attempts to depress the head 18 result only in the latter striking the upper edge 28 of the cylinder 24. Consequently, the cylinder 24 becomes disposed in blocking relationship with the head 18 as the ring 30 of cylinder 24 bottoms out against the surface 25 when the head 18 is attempted to be depressed. It should be apparent, therefore, that the cylinder 24 functions in the nature of a permanent, although releasable, lock for maintaining the head 18 in a fully "up" position.

In accordance with the present invention, a disposable lock 36 may be clipped onto the pump 10 to serve as a protective "overlock" for the cylinder 24 and preclude access to the latter unless the lock 36 is torn in two by the user prior to the first operation of the pump 10. To this end, the overlock 36 includes a split collar 38 having a pair of arcuate, circumferentially extending arms 40 and 42. The arms 40,42 are joined at one end by an interconnection 44 and terminate at their opposite ends in free tips 46 and 48, respectively. Each tip 46,48 carries an inturned hook 50, as well as a beveled outwardly facing cam surface 52 so disposed that the surfaces 52 mutually converge radially inwardly with respect to the annulus defined by the arms 40,42. Each arm 40,42 also is provided with an internal, arcuate rib 54 approximately midway between the upper and lower edges 56 and 58, respectively, of the corresponding arms 40,42 the ribs 54 extending longitudinally of the arms 40,42 for a substantial distance in opposite directions from the mid point of each of said arms.

The lock 36 also includes a break tab 60 projecting radially outwardly from the collar 38 from the interconnection 44 between the two arms 40,42. The tab 60 is integral with the collar 38, but the nature of the interconnection 44 is such that two lines of weakness 62 and 64 are presented at the junction of the arms 40,42 with the tab 60, respectively. Thus, upon sufficient manual manipulation of the tab 60, the latter may be torn from the collar 38 along either or both of the lines 62, 64 such as to destroy the interconnection 44 and thereby separate the collar 38 into two parts.

Although the lines of weakness 62,64 are such as to permit the tab 60 to be torn from the collar 38, nonetheless they are sufficiently strong to permit a certain amount of hinging of the arms 40,42 toward and away from one another, this being particularly important during installation of the lock 36 as will be shortly described. First, however, it is noteworthy to mention that preferably the lock 36 may be constructed from a synthetic resin material such as one of the well-known ABS resins.

When the lock 36 is to be installed on the pump 10, it matters not whether the cylinder 24 is in a locked or unlocked position, it being necessary only that the head 18 be fully raised with the cylinder 24 completely exposed. The lock 36 may then be gripped by its tab 60 in such a way that the cam surfaces 52 face the cylinder 24 in horizontal alignment with that portion of the cylinder 24 above the ring 30. Advancing the lock 36 to the cylinder 24 and engaging the latter with the surfaces 52 then causes the latter to induce the arms 40,42 to spread apart in a hinging action about the lines of weakness 62, 64 as the cylinder 24 enters the collar 38. Once the arms 40,42 have fully embraced the cylinder 24, the lock 36 may be rotated (if necessary) about the latter until the hooks 50 are generally in line with the slot 26 of the cylinder 24. Thereupon, each of the arms 40,42 may be depressed radially inwardly in the vicinity of the tips 46,48 until the hooks 50 snap into the slot 26 and are caught by the opposed vertical edges *26a* and *26b* of the cylinder 24 bounding the slot 26.

At this point, the lock 36 will be firmly retained upon the cylinder 24 in the manner illustrated in FIG. 3, any looseness between the collar 38 and the cylinder 24 being taken up by the internal ribs 54 as they press firmly against the sidewall of the cylinder 24. Also in this condition, and as illustrated best in FIG. 1, the upper and lower edges 56 and 58, respectively, of the collar 38 are disposed in abutting relationship with the lower surface *18a* of the head 18 and the upper surface *30a* of the ring 30 on cylinder 24. Consequently, the collar 38 is in blocking relationship to the head 18, preventing its depression regardless of the rotative position of the cylinder 24 with respect to the web 34. In fact, as may be evident, the cylinder 24 can be rotated at this time to any selected position thereof without having any effect whatsoever on the ability of the lock 36 to preclude depression of the head 18.

It is of substantial significance that once the lock 36 is snapped into place on the cylinder 24, the means by which the lock 36 is retained in place is unexposed and completely unaccessible. Note in this regard that the hooks 50 project well into the slot 26 of the cylinder 24 and that there is little, if any, room for the hooks 50 to be jimmied such as with a knife blade or other sharp instrument in order to release the collar 38. Consequently, for all practical purposes, once the lock 36 is installed, it can only be removed by tearing or otherwise sufficiently manipulating the break tab 60 along its lines of weakness 62,64 to separate the same from the collar 38 and destroy the interconnection 44 between the arms 40,42. The resulting separate parts can then simply be discarded, whereupon with the cylinder 24 in the proper position, the head 18 may be depressed in a pumping stroke.

It is important to recognize that while the lock 36 has been described for use in connection with the cylinder 24 as a temporary and disposable "overlock" therefor, the principles of the present invention are not so narrowly defined, such illustrated usage being made by way of example only. On the contrary, at least in its broadest respects, the principles of the present invention extend to a situation wherein the collar 38 may be continuous, rather than split as illustrated, in which event the lock 36 would be installed prior to assembly of the head 18 by slipping the collar 38 down over the exposed end of the plunger 16 and the cylinder 24. Moreover, it is not required that the lock 36 be utilized in connection with a second lock, i.e., the cylinder 24. In this respect, it is possible that no such locking cylinder 24 is desired on the pump 10, in which event the lock 36 would be the only locking device, temporary or otherwise, utilized in connection with the pump 10. In that situation, the collar 38 could be continuous as above described, or the plunger 16 could be provided with suitable structure to cooperate with the hooks 50 in retaining the lock 36 in place in the event that the collar 38 is split in the manner illustrated herein.

We claim:

1. In combination with a dispensing pump having a plunger and annular means through which the plunger reciprocates, said plunger and said annular means having a pair of opposed surfaces which are axially spaced apart when the plunger is in an extended position relative to the annular means, a disposable lock separate from the pump for preventing depression of the plunger comprising:

- a collar disposed about said plunger and between said surfaces in position to block depression of the plunger,
- said collar having a pair of parts provided with a connection therebetween; and
- a tab associated with said connection and operable only upon sufficient manual manipulation to destroy the connection and thereby release the collar from the plunger.

2. In the combination as claimed in claim 1, wherein said collar is discontinuous, presenting a pair of opposite free ends, said pump further including an annular member around said plunger and within said collar having means cooperating with said free ends to retain the collar on said member when said connection is intact.

3. In the combination as claimed in claim 2, wherein said free ends are located at one extremity of said parts, said connection being located at an opposite extremity of said parts.

4. In the combination as claimed in claim 2, wherein each of said free ends includes an inturned hook, said means of the member including structure for catching said hooks.

5. In the combination as claimed in claim 4, wherein said member has a slot bounded by a pair of opposite edges which extend longitudinally with respect to the path of relative travel of said surfaces, said edges defining said catching structure.

6. In the combination as claimed in claim 4, wherein said hooks are located in an unexposed, substantially nonaccessible position.

7. In the combination as claimed in claim 1, wherein said tab is integral with the collar.

8. In combination with a dispensing pump having a depressible plunger with an acutating head at one end thereof; annular means reciprocably receiving said plunger and having a normally stationary surface spaced below said head; and a permanent, annular releasable lock circumscribing said plunger between the head and the surface, said lock being rotatable to and from a locked position blocking depression of said head, a temporary, disposable overlock separate from said pump comprising:

- a split collar having a pair of circumferentially arcuate arms embracing said lock in blocking relationship to the head with respect to depression of the latter,
- said arms having a pair of free tips at one end thereof and a hinged interconnection at the opposite end thereof, permitting flexure of the arms during initial installation of the overlock on the pump;
- retaining means on said arms cooperating with structure on said lock to hold the arms in said embracing and blocking relationships; and
- a tab associated with said interconnection and operable to destroy the latter upon sufficient manual manipulation whereby to release the overlock from the pump.

9. In the combination as claimed in claim 8, wherein said retaining means is concealed and unaccessible when said overlock is installed.

10. In the combination as claimed in claim 9, wherein said structure on said lock includes a peripheral opening bounded by a pair of opposite edges, said retaining means including a pair of inturned hooks for said edges.

11. In the combination as claimed in claim 10, wherein said hooks are located on said tips.

12. In the combination as claimed in claim 8, wherein said tips are provided with cam means configured to spread said arms when the cam means is engaged by said lock during installation of the overlock.

13. In the combination as claimed in claim 12, wherein said cam means includes a pair of beveled, mutually and radially inwardly converging surfaces.

14. In the combination as claimed in claim 8, wherein said arms, said interconnection and said tab are integrally joined together.

15. In the combination as claimed in claim 14, wherein said interconnection includes a line of weakness between at least one of the arms and said tab.

16. In the combination as claimed in claim 15, wherein said tab projects radially outwardly from the collar, said line of weakness being at the radially inner end of the tab.

17. In the combination as claimed in claim 8, wherein said lock is provided with a pair of opposed surfaces disposed for engagement with said stationary pump surface on the one hand and said collar on the other hand, said collar being interposed between said head and said collar-engageable surface.

18. In the combination as claimed in claim 8, wherein both of said arms are of the same length.

* * * * *